UNITED STATES PATENT OFFICE 2,643,951

RICE PROCESS

Mattison W. Alderman, William F. Massmann, Jr., and Elmer W. Michael, Battle Creek, Mich., assignors to General Foods Corporation, New York, N. Y., a corporation of Delaware No Drawing. Application April 26, 1950, Serial No. 158,339

7 Claims. (Cl. 99—81)

The present invention relates to the production of expanded or puffed ready-to-eat cereal products, more particularly to an improved process therefor.

It has long been known that cereal products could be puffed by treating the kernels under steam at high pressure and suddenly liberating the pressure with the result that as the steam expands the cell walls of the kernel are thereby disrupted and burst. However, the resulting product is compressible and does not have the frangibility or crispness which is deemed desirable in a breakfast cereal product. Also, it is lacking the golden-brown color of the usual toasted product. To this extent, therefore, it is somewhat less than a completely satisfactory product. It was not until the introduction of the process of Luke, as disclosed in U. S. Patent No. 1,832,813, that a crisp, toasted, puffed breakfast cereal product could be provided. The Luke proposal involves essentially the slight compression of the cooked and partially dried cereal grains or grain elements. Such slight compression renders the grains or elements thereof capable of being puffed when they are subsequently toasted.

In carrying out the Luke process, however, certain difficulties are experienced. In the usual case, the cereal grains, such as rice, are cooked and thereafter dried to about 18% and tempered or stored in bins or silos for the purpose of effecting the even distribution of their moisture content. The grains are then compressed by passage between revolving rolls. Next they are introduced into a gas-fired toasting oven maintained at 300°–600° F. to simultaneously toast and puff them. This type of puffing is called oven-puffing as opposed to the aforementioned pressure or "gun" type of puffing. The oven which is used to toast and puff the grains is essentially an enclosed, horizontally revolving, cylindrical screen which is tilted to provide for the progress of the grains therethrough as the cylinder revolves. It has been found that the moisture content of the rice grains cannot be reduced appreciably below 18% without the same fracturing when they are compressed by passage between the rolls. On the other hand, a moisture content as high as 18% makes the rice grains somewhat sticky so that many of them stick to the sides of the revolving screen of the oven with the result that they burn. Of course, the grains which are burned must be removed from the product in order to provide one which is marketable. The manual labor that is involved in picking over the puffed product in order to remove the burned grains or pieces materially adds to the cost of the processing.

It was with the purpose of eliminating this problem that the proposal was made in U. S. Patent No. 1,925,267 to McKay, to dry the cooked cereal grains or pieces to 15–30% moisture, temper the grains, flatten them by passage between rolls, dry the flattened grains to 5–14% and then oven-puff the same. In order to carry this process out properly, it is necessary not only to have two drying steps but also to have two tempering operations. Adequate tempering requires between 6 and 10 hours of storage in tempering bins or silos. It is readily seen that the drying and tempering storage capacity would have to be doubled in order to properly carry out the McKay proposal. Such would amount to an item of considerable expense so that the advantages of this proposal in eliminating the need of picking over the product to remove burned rice grains is off-set by a disadvantage of similar magnitude.

It has now been found that rice grains and elements thereof containing between 10–14% moisture may be compressed by passage between revolving steel rolls without being fractured provided the kernels or grain elements are at a temperature within the range of about 140°–210° F. at the time of such compression. Without in any way limiting the present invention by the advancement of theoretical explanation, it is believed that the kernels or grain elements must be sufficiently plastic to avoid their being fractured during the compressing operation and that this plasticity is dependent not only upon the moisture content but also upon the temperature of the rice grains and grain elements. In other words, for the rice to be suitably plastic for compression or flattening purposes, the grains or pieces at 18% moisture need only to be at a temperature of about room temperature or somewhat above, whereas grains of lower moisture content being insufficiently plastic at room temperature or slightly above require heating to the aforementioned temperature range to become suitably plastic for successful compression or flattening by rolling.

Of course, there is a limit to the extent to which heating the grains can be relied upon to compensate for the lower moisture content thereof in order to provide the necessary plasticity. The minimum moisture content is about 10% and rice grains or pieces of less than this moisture content require heating to temperatures which approach those relied upon for the puffing operation and are therefore excessive. Premature puffing is to be avoided since the resultant product is not puffed to the same desirable degree as is provided by puffing the flattened grain. The upper moisture content of about 14% is determined by the increasing tendency of the grains to stick to the sides of the rotary toasting oven at moisture contents appreciably above 14%. There is no such tendency in grains that have been dried to 14% moisture. The same considerations as those set forth above also determine the aforementioned temperature range of about 140°-210° F. to which the rice grains or elements thereof are heated for compression purposes in accordance with the process of the present invention.

The temperature of the rice grains or elements thereof may be raised to the aforementioned temperature range by any conventional means for the purposes of being flattened by passage between the rolls. The heating may be effected, for example, by passing the grains through a horizontally revolving drum which is heated by the countercurrent passage of hot gases or live steam therethrough or the application of a gas flame or steam to the outside of the drum. Precaution should be taken, however, to avoid appreciably altering the moisture content of the grain when it is heated by the direct application of hot gases or steam. Such can be avoided, on the one hand, by the humidification of the hot gases to the proper degree and, on the other hand, by the use of properly controlled superheated steam to minimize condensation on the grains. As an adjunct to the use of superheated steam it is, of course, possible to dry the rice grains or elements thereof to a somewhat lower moisture content, say, 9.5%, in order to compensate for the small moisture pickup, say, 0.5–1.0%, that might result from heating the rice in this manner. The heating can also be effected by the use of electrical or dielectric heating. The latter involves passing the grains between a pair or series of pairs of opposed plates carrying exceedingly high and opposed electrical charges. It is preferable, however, from the standpoint of practical operating considerations to employ infra-red heating or a combination thereof with electrical heating. The use of such permits the practical, economic rapid heating of the rice grains immediately prior to their passage between the rolls. It also permits the grains or pieces to be heated in a relatively thin layer. The importance of this last resides in the fact that the increased plasticity which results from heating the grains to the aforementioned temperature range results in the grains being somewhat sticky. For this reason there is a tendency for them to lump together and it is, therefore, highly preferable that it be possible to heat the grains in the aforementioned thin layer and also immediately prior to their passage between the rolls.

The following example sets forth in detail one manner in which the process of the present invention may be employed. It will be understood, however, that the invention is not to be limited by such details but is to be regarded in its broader aspects and construed by reference to the appended claims.

100 pounds of rice are mixed with a flavoring syrup made from 2¾ pounds of salt, 13 pounds of sugar and 18 pounds of water. The mixture is placed in a rotary cooker and cooked under 15 pounds steam pressure for one or two hours, or until all of the rice is thoroughly cooked. The cooked rice is cooled and dried to a moisture content of about 13% in a conventional drum dryer and then transferred to a tempering bin where it is allowed to remain for between 6 and 10 hours, preferably 8 hours, for the purpose of tempering, i. e., to permit the moisture contained in the interior of the partially dried grains to become evenly distributed throughout the same. The grain is then deposited in a thin bed on a vibrating conveyor and heated thereon to a temperature of about 190° F. by means of a series of about 6 infra-red radiant heaters which are located above the vibrator and also by means of electrical strip heaters attached to the bottom of the conveyor. The hot rice falls uniformly from the edge of the pan between standard, conventional flaking rolls which are set at such a pressure that the rice kernels are reduced to about 0.035 of an inch in thickness. In any event, the rice kernels are compressed to such a degree that the oven-puffed product is of such a bulk density that 1000 c. c. thereof weigh 140 g.±10%. From the rolls the compressed grains or pieces are then conveyed to a rotary toasting oven of the type described above wherein the compressed grain is simultaneously toasted and puffed to provide a crisp, friable, toasted and puffed rice product several times the size of the original kernel.

As indicated above in connection with the specific example, it is preferred that for compression purposes the moisture content of the rice grains be between 12–13% and be heated to a temperature within the range of about 160°–190° F. Such provides for best results from the standpoint of avoiding the fracturing of the grain upon compression and preventing the compressed kernels from sticking to the side walls of the oven during subsequent toasting and puffing.

As is well known to those skilled in the art, the degree of compression to which the grains or pieces thereof are subjected controls in large measure the degree of puffing that is obtained when the compressed grains are subsequently toasted. The compression or flattening must occur to a sufficient extent to insure disrupting the internal cell walls of the grain and thereby alter its structure. Otherwise no substantial amount of puffing will occur. On the other hand, if the grains are compressed to such an extent that the degree of compression begins to approach that of a flaking operation the degree of puffing that is obtained during subsequent toasting is also considerably less than satisfactory. Such considerations, however, are well known to those skilled in the art and it is to be understood that the scope of the appended claims is intended to cover any and all degrees of compression capable of providing a product of any substantially satisfactory degree of puffing.

What is claimed is:

1. The process of treating rice which comprises cooking the same in the presence of moisture, drying the cooked rice to a moisture content within the range of about 10–14%, compressing the individual rice kernels and pieces thereof while the temperature of said kernels and pieces is within the range of about 140°–210° F., and thereafter subjecting the same to a high temperature whereby they are puffed.

2. The process of claim 1 in which the rice is tempered after being dried and before being heated for the purposes of compression.

3. The process of claim 1 in which the rice is dried to a moisture content within the range of about 12–13% and heated to a temperature within the range of about 160°–190° F. for the purposes of compression.

4. The process of claim 1 in which the rice is heated to a temperature range of about 140°–210° F. by the application of infra-red heat substantially immediately before compression.

5. The process of claim 1 in which the compressed rice kernels and pieces thereof are subjected to a toasting and puffing temperature within the range of about 300°–600° F.

6. The process of treating rice which comprises cooking the same in the presence of moisture, drying the cooked rice to a moisture content within the range of about 12–13%, tempering said dried rice for a period of about 6–10 hours, compressing the individual rice kernels and pieces thereof while the temperature of said kernels and pieces is within the range of about 160°–190° F., and thereafter subjecting the same to a high temperature whereby they are toasted and puffed.

7. The process of treating rice which comprises cooking the same in the presence of moisture, drying the cooked rice to a moisture content within the range of about 12–13%, heating the rice to a temperature within the range of about 160°–190° F. by the application of infrared heating and substantially immediately thereafter compressing the rice kernels and pieces thereof, and thereafter subjecting the same to a high temperature whereby they are toasted and puffed.

MATTISON W. ALDERMAN.
WILLIAM F. MASSMANN, Jr.
ELMER W. MICHAEL.

References Cited in the file of this patent

UNITED STATES PATENTS

| Number | Name | Date |
|---|---|---|
| 1,832,813 | Luke | Nov. 17, 1931 |
| 1,925,267 | McKay | Sept. 5, 1933 |
| 2,064,701 | Stokkebye | Dec. 15, 1936 |

FOREIGN PATENTS

| Number | Country | Date |
|---|---|---|
| 16,525 | Australia | 1928 |